Figure 1:
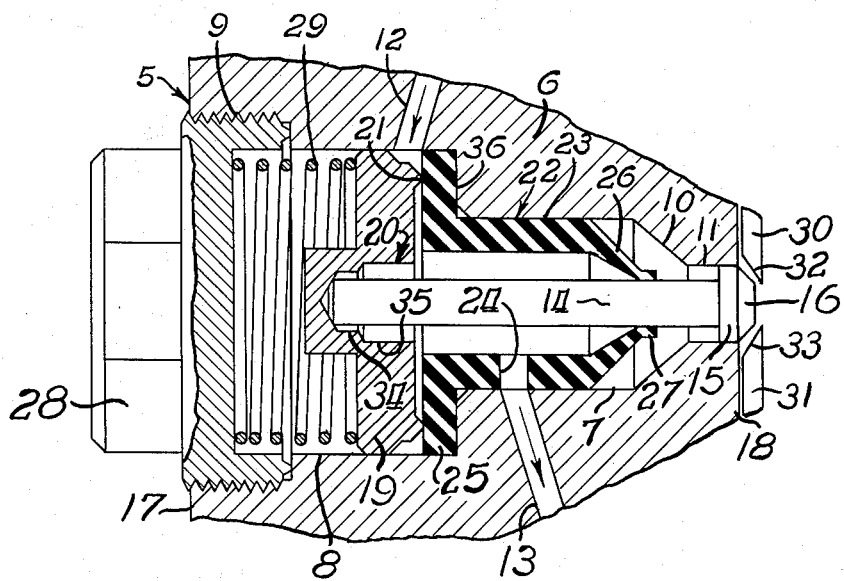

May 29, 1956 E. E. MEUSY 2,747,834
SEALING MEANS
Filed July 27, 1953

INVENTOR.
Eugene E. Meusy
BY
Seegert & Schwalbach
Att'ys.

United States Patent Office 2,747,834
Patented May 29, 1956

2,747,834
SEALING MEANS

Eugene E. Meusy, Milwaukee, Wis., assignor to Milwaukee Gas Specialty Company, Milwaukee, Wis., a corporation of Wisconsin Application July 27, 1953, Serial No. 370,413

2 Claims. (Cl. 251—335)

This invention relates to improvements in sealing means, and more particularly to improved means for sealing the circumferential clearance between two interfitting cylindrical parts, for example the circumferential clearance between a cylindrical bore and a coaxial cylindrical shaft.

It has been common practice in the past to utilize an O ring type of seal where it is desired to seal off the circumferential clearance between two interfitting circular parts. This type of seal is frequently used in high pressure equipment wherein the high fluid pressure is relied on to deform the O ring in a manner to provide an effective seal. In certain other applications where frictional drag is not an important consideration, a seal is provided by radial compression of an O ring between the surfaces to be sealed thereby. This latter type of seal, however, usually create substantial frictional drag on the shaft thus sealed.

In apparatus wherein the working pressures are relatively low, for example in control apparatus for gaseous fuel, the fluid pressure cannot be relied on to deform an O ring in order to effect a seal. Furthermore, since certain equipment has only a limited amount of motive force available, friction drag created by the seals therein is a very important factor to be considered. In order to effectively utilize an O ring in apparatus of the aforementioned character, it is necessary that the O ring have a cross-sectional thickness slightly greater than the radial clearance between the interfitting parts, so that the seal is effected by radial compression of the ring between the opposing surfaces to be sealingly engaged, thereby reducing the radial thickness of the ring to equal the radial clearance between said parts. This arrangement results in substantial friction when one of said parts is moved relative to the O ring. Moreover, in order to utilize O rings in equipment of the aforementioned character it is necessary to maintain very close tolerances in the dimensions of the interfitting parts, since the slight variation from the desired dimension can mean a poor seal or too much friction drag.

The problem is further complicated by the fact that O rings cannot be manufactured with uniform cross-sectional dimensions. Frequently O rings have a "flash" ridge extending around both the inner and outer periphery. Obviously, for a given radial spacing between the interfitting parts rings having flash ridges are compressed substantially more, and hence create substantially more friction.

It is therefore a principal object of the present invention to provide an improved sealing means for sealing the circumferential clearance between two interfitting coaxial parts, which means functions effectively as a seal in equipment of the aforementioned character while at the same time having low frictional drag characteristics.

A further object of the invention is to provide an improved sealing means which does not require the maintenance of precise tolerances between the parts being sealed thereby.

A further object of the invention is to provide an improved sealing means of the character described which maintains the proper seal regardless whether the parts sealed thereby are subject to rotary or reciprocatory motion, or whether said parts are stationary.

A further object of the invention is to provide an improved sealing means which when utilized with relative rotatable or reciprocatory interfitting parts maintains an effective seal without excessive friction drag, and in the case of relatively rotatable parts, despite eccentricity of the rotating part.

More specifically it is an object of the invention to provide an improved sealing means comprising a sleeve of elastomeric material the wall of which is Z-shaped in transverse cross-section, said sleeve having a larger diameter portion and having a smaller diameter or collar portion offset axially from said larger diameter portion. The larger diameter portion of said sleeve is radially compressed within and has its outer surface in relatively high friction sealing engagement with the surface of the bore of the outer interfitting part to anchor said sleeve in said bore, and the inner surface of the said larger diameter sleeve portion is spaced radially from the inner interfitting part, for example a shaft; said collar portion having a tension fit on, and having its inner surface sealingly engaging the surface of the shaft, and the outer surface of said collar portion being spaced from said bore surface.

A further object of the invention is to provide an improved seal of the character described wherein the larger diameter portion has a substantial wall thickness and has an outer diameter sufficiently large to provide for sealing engagement with the bore under all conditions of normal manufacturing dimension variations. The improved sealing means does not require a finely machined bore surface, since the resiliency of the sleeve permits the latter to conform to surface irregularities and maintain a proper seal. In fact, surface irregularities may be desirable in certain instances to provide improved anchoring of the sleeve.

A further object of the invention is to provide an improved seal of the character described wherein the collar portion of the sleeve has reduced wall thickness and axial length to permit circumferential stretching of said collar around the shaft to provide a tension fit with minimum friction, while at the same time maintaining a proper seal, the sealing engagement of the collar portion with said shaft being accomplished only by said circumferential stretching of the collar, and is not the result of any external compressive stresses exerted on said collar and shaft.

A further object of the invention is to provide an improved seal of the character described in which variations in bore or shaft diameter can have no cumulative effect upon the seal as they can in an O ring type of seal, variations in bore diameter having no effect upon the seal provided by the collar portion of said sleeve, and variations in shaft size having no effect upon the seal provided by the larger diameter portion of the sleeve, this being true because said sleeve portions are offset axially from one another and are free to deflect radially, so that the wall thickness of said sleeve is unaffected by variations in bore and shaft diameters.

A further specific object of the invention is to provide an improved seal of the character described in one form of which the sleeve is provided with integral means forming a valve seat.

Further objects and advantages will appear as the description proceeds, reference being had to the accompanying drawing which illustrates two forms of the invention.

Figure 2:
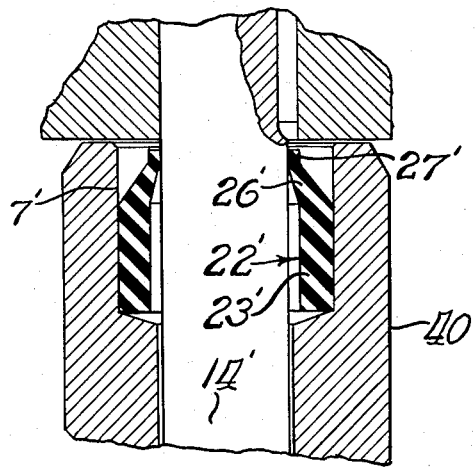

In the drawing:

Figure 1 is a fragmentary axial sectional view of a valve having one form of the improved sealing means embodied therein and providing both a valve seat and a low friction valve stem seal; and Figure 2 is a fragmentary axial sectional view of another form of the invention providing a low friction shaft seal for a rotary shaft.

Referring more particularly to the drawing, the form of the invention selected for illustration comprises a valve constructed in accordance with the invention and adapted to control the flow of fluid, for example gaseous fuel. While the invention has particular utility in apparatus in which only limited motive forces are available, it is in no wise limited to use in this field.

Likewise, the invention is not limited to use in valves, it being within the concept of the invention to utilize the improved sealing means for sealing the circumferential clearance between any two interfitting cylindrical parts to which said sealing means can be effectively applied, said sealing means having particular utility where a low friction seal is required.

Referring to Figure 1, the illustrated valve is indicated by the numeral 5 and may form part of an assemblage, for example the fuel control device disclosed in the co-pending application for patent of Herman A. Mihm, Serial No. 359,184, filed June 2, 1953. The aforementioned device is thermocouple powered and affords relatively small motive forces. The assemblage may include other elements (not shown) which elements may be enclosed within a common casing or body 6. Obviously, the valve 5 may be independent of other elements, if desired. The body 6 is formed with a main bore 7 and a counterbore 8 providing a flat annular shoulder 36 at the base of the counterbore 8. The counterbore 8 has an internally threaded outer end portion 9 of enlarged diameter. The main bore 7 has a tapered portion 10, as well as a portion 11 of reduced diameter. The bore portion 9 opens into one surface 17 of the body 6, and the bore portion 11 opens into an opposite surface 18 of said body. The body 6 may have a fuel inlet passage 12 opening into the counterbore 8, and may have a fuel outlet passage 13 opening into the main bore 7 as shown.

A valve stem 14 extends coaxially within the main bore 7 and counterbore 8 and is provided with an enlarged cylindrical head 15 axially slidably positioned in the bore portion 11. The head 15 has a frusto-conical end portion 16 normally projecting from the bore portion 11 beyond the surface 18 as shown. A valve member 19 is axially slidably positioned in the counterbore 8 and is formed with axial recess 20 in which the opposite end of the stem 14 is received, said valve member 19 being preferably formed with an annular rib 21 in its face adjacent the shoulder 36. The recess 20 preferably comprises a bore 34 having a counterbore 35, the bore 34 having a diameter slightly larger than the stem 14, and the counterbore 35 having a somewhat larger diameter than the bore 34. The radial clearance between the stem 14 and the bore 34 and counterbore 35 permits pivotal movement of the valve member 19 relative to the stem to thereby insure proper seating of the valve member as will hereinafter appear.

In order to provide a low friction sealing means for sealing the circumferential clearance between the surface of the main bore 7 and the outer surface of the stem 14, as well as to provide a resilient seat of the valve member 19, an improved sleeve member 22 of a novel construction and illustrative of the inventive concept is utilized. The sleeve 22 is made of resilient molded material, for example polyacrylate synthetic elastomeric material. The sleeve 22 has a major portion 23 having a normal outside diameter which is slightly larger than the main bore 7, said sleeve having substantial wall thickness and being pressed into said main bore to effect a relatively high friction seal between the outer surface of the sleeve portion 23 and the surface of bore 7 and thereby anchor the sleeve 22 in the bore 7. The inner surface of the sleeve portion 23 is spaced from the valve stem 14 as shown and is free to deflect radially inwardly. The sleeve portion 23 has an aperture 24 in registry with the fuel outlet passage 13, and also has a radially outwardly directed flange 25 which abuts the annular surface 36 as shown, to provide a resilient seat for the valve member 19.

A funnel-shaped portion 26 of tapering wall thickness connects the portion 23 with a collar portion 27. The collar portion 27 is offset axially from the sleeve portion 23 and has a normal inside diameter slightly smaller than the outside diameter of the valve stem 14, said collar having reduced wall thickness and relatively short axial length permitting said collar to be circumferentially stretched around said stem to cause the inner surface of said collar to sealingly engage said stem with a minimum of friction. Since the outer surface of the collar 27 is spaced from the bore surfaces 7 and 10, the seal provided by said collar is a function only of the elasticity of said collar and the tension to which it is subjected, and is independent of the spacing between the stem 14 and the bore.

The radial spacing between the inner surface of the sleeve portion 23 and the stem 14 provides a space into which the sleeve portion 23 is free to move upon radial compression thereof without substantially affecting the wall thickness of said sleeve portion. Similarly the spacing between the outer surface of the collar portion 27 and the surfaces of bore portions 7 and 10 provides a space into which the collar 27 is free to move upon radial enlargement thereof. Since the wall thickness of the sleeve 22 throughout its length is substantially less than the radial spacing between the surface of the stem and the surrounding bore portions, the wall thickness of the sleeve 22 is independent of said radial spacing, and therefore slight variations in the diameter of the bore portion 7 and of the stem 14 have no substantial effect on the wall thickness of the sleeve 22. Moreover, variations in bore diameter have no effect upon the fit of the collar portion 27 on the stem 14, and variations in stem diameter have no effect upon the fit of the sleeve portion 23 in the bore portion 7. This is in contradistinction to the O ring type of seal wherein the wall thickness of the O ring substantially fills radial spacing between the bore and the stem, and variations in the diameter of the bore and stem may act cumulatively to substantially vary the wall thickness of the O ring, and to thereby substantially increase the friction drag exerted by said ring on the stem.

A recessed plug 28 is threaded into the bore portion 9 and closes the counterbore 8, there being a coiled compression spring 29 having one end positioned in the recess of said plug and having its opposite end abutting the valve member 19 to bias the latter toward its seat 25. Suitable actuating means may be provided for moving the valve member 19 off its seat to thereby permit flow of fluid through the valve 5. For example, a pair of cam members 30 and 31 of the type disclosed in the previously referred to application, Serial No. 359,184, may be mounted for movement normal to the axis of the stem 14, said cams having cam surfaces 32 and 33 respectively which are engageable with the surface of the stem head portion 16. When the cam member 30 is moved downwardly, as viewed in the drawing, the surface 32 engages the head portion 16, forcing the stem 14 and valve member 19 axially to the left against the bias of the spring 29, thereby moving said valve member off the seat 25 and permitting fluid flow through the passage 12, counterbore 8, the interior of the sleeve 22, aperture 24, and out the passage 13. Upon retraction of the cam member 30 to its normal position shown, the valve member 19 is returned to its seat under the bias of spring 29. Proper seating of the valve member 19 is insured by the ability of the latter to pivot relative to the stem 14 and to thereby adjust itself into alinement with the seat 25.

The improved sealing means maintains a proper seal at all times with a minimum of frictional drag on the stem 14. The improved sleeve 22 can be manufactured to close tolerances since its shape is such that in the molding process no flash ridges occur on the sealing surfaces. Due to the resiliency of the material from which the sleeve 22 is made and to the fact that the wall thickness of said sleeve is independent of the spacing between the stem and bore, said sleeve can deflect radially to conform to variations in bore diameter without causing any change in the friction drag exerted on the stem by said sleeve, and said sleeve can also conform to any surface irregularities in the bore. Thus, precision machining of the bore or shaft surfaces is unnecessary. As pointed out previously, surface irregularities in the bore 7 may be advantageous in certain instances to provide increased frictional engagement and therefore better anchoring of the sleeve 22 in the bore 7.

The form of the invention illustrated in Figure 1 provides for the flow of fuel through the sleeve, and therefore substantial radial clearance is provided between the stem 14 and the inner surface of the sleeve portion 23. Where fluid flow through the sleeve 22 is not desired, as in the form of the invention illustrated in Figure 2, the radial clearance between the stem 14 and portion 23 of the sleeve can be less than that illustrated, thus permitting the diameter of sleeve portion 23 and the diameter of the bore 7 to be reduced.

Since the improved sealing means does not rely on the fluid pressure or compression between the relatively movable parts to effect a proper seal, it is particularly well adapted for use in low pressure equipment, and its low frictional drag characteristics make it well adapted for use in equipment in which only limited motive forces are available. The improved sealing means provides an effective seal whether the shaft sealed thereby has rotary motion or reciprocatory motion.

Referring now to Figure 2 of the drawing in which the improved sealing means is utilized as a shaft seal, the parts indicated by primed numerals correspond to similar parts of the form of the invention shown in Figure 1 and indicated by the same numerals unprimed. The shaft 14' is rotatably mounted in a bearing sleeve 40 and may form part of an electromagnetic operator of the general type shown in the copending application for patent of Floyd J. Bydalek and Russell B. Matthews, Serial No. 270,666, filed February 8, 1952.

The bearing sleeve 40 is formed with a counterbore 7' to receive the sealing sleeve 22'. The portion 23' of the sleeve 22' is radially compressed within and sealingly engages the wall of the bore 7' to anchor said sleeve in said bore. The collar portion 27' is circumferentially stretched around and is in sealing engagement with the surface of the shaft 14' to provide a tension fit. In addition, the sleeve portion 23' is spaced radially from the shaft 14' and is free to deflect radially inwardly, whereas the collar portion 27' is spaced radially from the surface of the bore 7' and is free to deflect radially outwardly.

The form of the invention shown in Figure 2 provides a sealing action which is substantially identical to that provided by the form of the invention shown in Figure 1. The advantages pointed out relative to the sleeve 22 in Figure 1 apply equally well to the sleeve 22' in Figure 2 with the exception that the sleeve 22' does not provide the valve seat function provided by the sleeve 22. Due to the fact that no provision is made for flow of fluid through the sleeve 22', the sleeve portion is positioned relatively close to the surface of the shaft 14', thereby providing a very compact seal construction.

The form of the invention shown in the drawing has been selected for the purpose of illustration only and is not intended to in any way define the limits or scope of the invention. Various changes and modifications may be made without departing from the spirit of the invention, and all of such changes are contemplated as may come within the scope of the claims.

What is claimed as the invention is:

1. A combined valve seat and valve stem seal for valves having a bore, having an annular shoulder surrounding one end of said bore, and having a valve member provided with a movable valve stem extending within said bore, comprising, a sleeve of resilient material having an outwardly directed annular flange, said sleeve being coaxially positioned in said bore in surrounding relationship with respect to said stem and with said annular flange abutting said annular shoulder to provide a valve seat, said sleeve also having first and second annular extents, said first extent having a normal diameter larger by predetermined amount than the diameter of said bore, wherefore predetermined radial compression of said first extent is effected by the disposition of said extent within said bore, said radial compression being sufficient by itself to hold said resilient member in operative position within said bore and to effect the gas tight seal between said first extent and the surface of said bore, said first extent being radially spaced from said stem, and said second extent being radially spaced from said bore surface and sealingly and slidably engaging said stem.

2. A combined valve seat and valve stem seal for valves having a bore, having an annular shoulder surrounding one end of said bore, and having a valve member provided with a movable valve stem extending within said bore, comprising, a sleeve of resilient material having an outwardly directed annular flange, said sleeve being co-axially positioned in said bore in surrounding relationship with respect to said stem and with said annular flange abutting said annular shoulder to provide a valve seat, said sleeve also having first and second annular extents, said first extent being radially spaced from said stem and having a normal diameter larger by predetermined amount than the diameter of said bore, wherefore predetermined radial compression of said first extent is effected by the disposition of said extent within said bore, said radial compression being sufficient by itself to hold said resilient member in operative position within said bore and to effect the gas tight seal between said first extent and the surface of said bore, and said second extent forming a collar radially spaced from said bore surface and having an inner diameter smaller by predetermined amount than the outer diameter of said stem wherefore predetermined radial expansion of said collar is effected by disposition of said collar in said surrounding relationship to said stem, said radial expansion being sufficient by itself to effect a gas tight seal between said stem and said collar while permitting relative movement therebetween.

References Cited in the file of this patent

UNITED STATES PATENTS

| 116,433 | Glover | June 27, 1871 |
| 393,980 | Hill | Dec. 4, 1888 |
| 1,805,257 | Pitt | May 12, 1931 |
| 2,028,634 | Walker | Jan. 21, 1936 |
| 2,172,079 | Boehm | Sept. 5, 1939 |
| 2,412,685 | Hoffman | Dec. 17, 1946 |
| 2,605,784 | Snider | Aug. 5, 1952 |
| 2,610,024 | Wirth | Sept. 9, 1952 |
| 2,625,170 | Mayer | Jan. 13, 1953 |
| 2,661,019 | Snyder | Dec. 1, 1953 |

FOREIGN PATENTS

| 944,478 | France | Dec. 1, 1953 |